United States Patent
Solomon

(10) Patent No.: US 6,892,938 B2
(45) Date of Patent: May 17, 2005

(54) GAMING SYSTEM AND METHOD FOR COMPLETING A TRANSACTION ASSOCIATED WITH A GAMING MACHINE

(75) Inventor: Gregg Solomon, Henderson, NV (US)

(73) Assignee: Mandalay Resort Group, Las Vegas, NV (US)

( * ) Notice: Subject to any disclaimer, the term of this patent is extended or adjusted under 35 U.S.C. 154(b) by 2 days.

(21) Appl. No.: 10/217,971

(22) Filed: Aug. 13, 2002

(65) Prior Publication Data

US 2004/0031845 A1 Feb. 19, 2004

(51) Int. Cl.[7] .............................................. G06F 17/60
(52) U.S. Cl. ...................... 235/375; 235/380; 235/382; 463/29; 382/115; 705/18; 713/186; 340/5.52; 340/5.82
(58) Field of Search ................................. 235/375, 379, 235/380, 381, 382, 382.5; 902/1, 3, 4, 5, 23; 463/25, 27, 21, 29; 382/115, 117, 118, 119, 124; 705/18, 44; 713/186, 202; 340/5.52, 5.53, 5.81, 5.82, 5.83, 8.84

(56) References Cited

U.S. PATENT DOCUMENTS

| | | | |
|---|---|---|---|
| 4,993,068 A | 2/1991 | Piosenka et al. ............ | 713/186 |
| 5,429,361 A | 7/1995 | Raven et al. ................. | 463/25 |
| 5,702,304 A | 12/1997 | Acres et al. .................. | 463/29 |
| 5,766,076 A | 6/1998 | Pease et al. .................. | 463/27 |
| 5,839,956 A | 11/1998 | Takemoto .................... | 463/25 |
| 6,110,044 A | 8/2000 | Stern .......................... | 463/29 |
| 6,264,557 B1 | 7/2001 | Schneier ...................... | 463/29 |
| 6,511,376 B2 | 1/2003 | Walker et al. ................ | 463/21 |
| 6,612,928 B1 | 9/2003 | Bradford et al. ............. | 463/29 |
| 6,743,098 B2 * | 6/2004 | Urie et al. .................... | 463/29 |
| 2003/0054878 A1 | 3/2003 | Benoy et al. ................. | 463/29 |
| 2003/0131265 A1 | 7/2003 | Bhakta ........................ | 713/202 |
| 2003/0150911 A1 | 8/2003 | Joseph ........................ | 235/382 |
| 2003/0228898 A1 * | 12/2003 | Rowe .......................... | 463/25 |

FOREIGN PATENT DOCUMENTS

| | | |
|---|---|---|
| JP | 1-181888 A | 7/1989 |
| JP | 6-205872 A | 7/1994 |
| JP | 7-313712 A | 12/1995 |

* cited by examiner

*Primary Examiner*—Jared J. Fureman
(74) *Attorney, Agent, or Firm*—Howard & Howard

(57) ABSTRACT

A system and method are used to complete a transaction associated with a gaming machine. The system and method assign the transaction to an employee of the casino and sense a biometric characteristic of the employee at a jackpot fill station. The sensed biometric characteristic is compared with a stored characteristic of the employee and a match is confirmed. The transaction is authorized if the match is confirmed.

25 Claims, 3 Drawing Sheets ures for the
GAMING SYSTEM AND METHOD FOR COMPLETING A TRANSACTION ASSOCIATED WITH A GAMING MACHINE

FIELD OF THE INVENTION

The present invention relates generally to gaming machines, and more particularly, to a system and method for completing a transaction associated with a gaming machine.

BACKGROUND OF THE INVENTION

The casino gaming market has seen rapid growth and competition in recent years. As the gaming market expands, in terms of revenue and geography, casino operators face increased tracking and auditing levels and complexities.

For example, auditing levels and procedures for the payouts (e.g., jackpots, credits, hopper fills) of slot machine jackpots vary by state. A certain level of "win" by a player is paid by the slot machine, without the intervention of any employee of the casino. However under certain circumstances, intervention by one or more casino employees is required. One typical procedure used involves three employees.

The first employee is present on the floor where a number of slot machines are located. When a handpay is required, the first employee walks to the slot machine and takes "ownership" of the handpay. In one example, the first employee takes ownership by inserting an employee identification card into a card reader on the slot machine and/or entering an employee identification number on a keypad on the slot machine. The first employee may also write down the winning combination of the reels of the slot machine. After the first employee is identified, the employee's name appears on a display. The first employee then chooses handpay via the keypad. The amount of the handpay is then displayed on the display, where it can be verified.

The first employee then proceeds to a jackpot fill station which includes a computer. The first employee is then identified by the computer system using their identification card and PIN number, in a similar manner. After the first employee is identified, the computer system lists all of the jackpots or transactions owned, but not completed, by the first employee. The first employee selects the desired handpay and may enter the winning combination previously written down.

After the desired transaction has been selected and verified, the computer system prints a "Ticket". The Ticket includes an original and at least one copy.

The first employee must then take both the original Ticket and the copy of the Ticket to a cashier booth. The cashier booth is operated by a second employee, i.e., a cashier. First, the first employee must sign the Ticket and give both copies to the cashier. The cashier prepares and counts the money out to the first employee and returns the original Ticket to the first employee.

The first employee leaves the cashier booth and locates a third employee to act as a witness. One manner in which the first employee may locate a third employee is by requesting a witness over a radio. The first and third employees then return to the slot machine. The first employee must re-insert their ID card into the card reader on the slot machine. The first employee may then pay the player, ensuring that the third employee is watching. The first employee removes their card from the card reader. The third employee or witness inserts their ID card into the card reader to identify themselves as the witness. The witness must also sign the original Ticket. The Ticket must then be dropped into a drop box located at a jackpot fill station.

These procedures are aimed at meeting the governmental reporting requirements for the casino and reducing fraud and theft. However, the procedures are lengthy, involve several employees of the casino, and do not sufficiently reduce the threat of fraud or theft.

The present invention is aimed at one or more of the problems set forth above.

SUMMARY OF THE INVENTION AND ADVANTAGES

In one aspect of the present invention, a method for completing a transaction associated with a gaming machine is provided. The method includes the steps of assigning the transaction to an employee of the casino, sensing a biometric characteristic of the employee, comparing the sensed biometric characteristic with a stored characteristic of the employee and responsively confirming that the sensed biometric matches the stored characteristic of the employee. The transaction is authorized if a match is confirmed.

In another aspect of the present invention, a gaming system for a casino is provided. The system includes at least one gaming machine having a control system. The control system is adapted to identify an employee of the casino and to assign a transaction to the employee of the casino. A computer is located at a jackpot fill station and is coupled to the at least one gaming machine. The computer is adapted to receive the identity of the employee, sense a biometric characteristic of the employee, compare the sensed biometric characteristic with a stored characteristic of the employee and responsively confirm that the sensed biometric matches the stored characteristic of the employee. The transaction is authorized if a match is confirmed.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
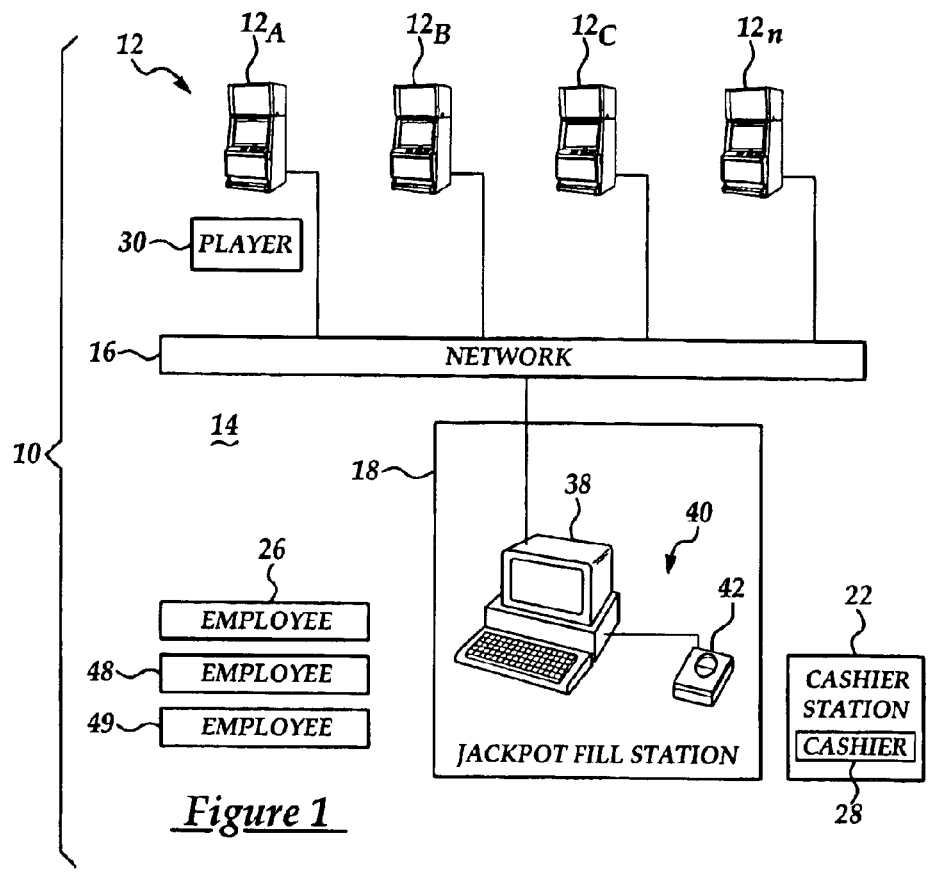
FIG. 1 is a diagrammatical illustration of a gaming system having at least one gaming machine, according to an embodiment of the present invention.

With reference to the drawings, and in operation, the present invention provides a gaming system 10 and method 50, 60. With specific reference to FIG. 1, in one aspect of the present invention, the system 10 includes at least one gaming machine 12 located on the casino floor 14. The system 10 and method 50, 60 uses sensed biometric characteristics of employees to complete a transaction or a payout, e.g., jackpots, cancelled credits, hopper fills, etc., associated with the at least one gaming machine 12. In the illustrated embodiment, the system 10 includes a plurality of gaming machines $12_A$, $12_B$, $12_C$ ... $12_n$ which are shown as slot machines. The slot machines $12_A$, $12_B$, $12_C$, $12_n$ are connected to a network 16. The network 16 is also coupled to a computerized accounting system (not shown) for transferring accounting information from the slot machines $12_A$, $12_B$, $12_C$, ... $12_n$ to the accounting system. The network 16 may also be used to transfer other data to the gaming machines 12, such as programming data, jackpot information (e.g., progressive data), etc. ...

One or more jackpot fill stations 18 and one or more cashier stations 22 are also located on the casino floor 14. In one embodiment, the jackpot fill and cashier stations 18, 22 are located separately. In another embodiment, a jackpot fill station 18 and a cashier station 22 are located at a single location. The cashier stations 22 are operated or manned by one or more employees ("cashiers") 28 of the casino.

Figure 2:
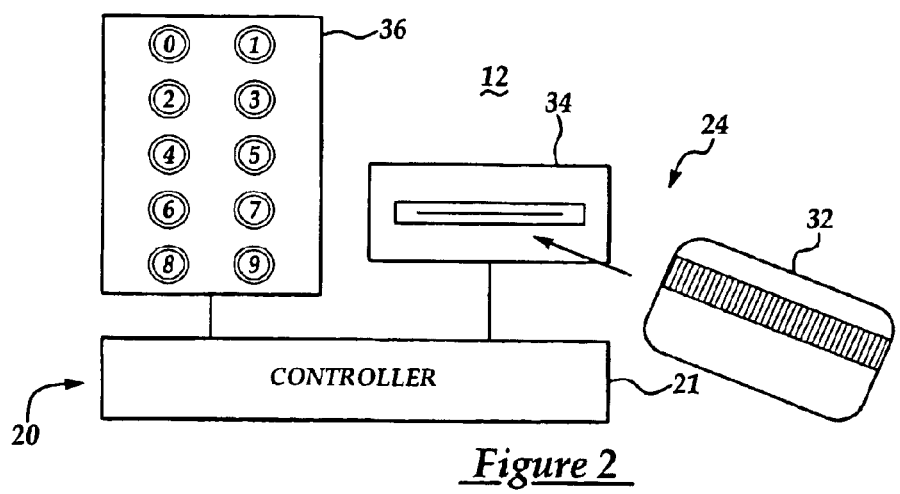
FIG. 2 is a block diagram of a gaming machine having a control system with a controller and an identification system, according to an embodiment of the present invention.
Figure 3:
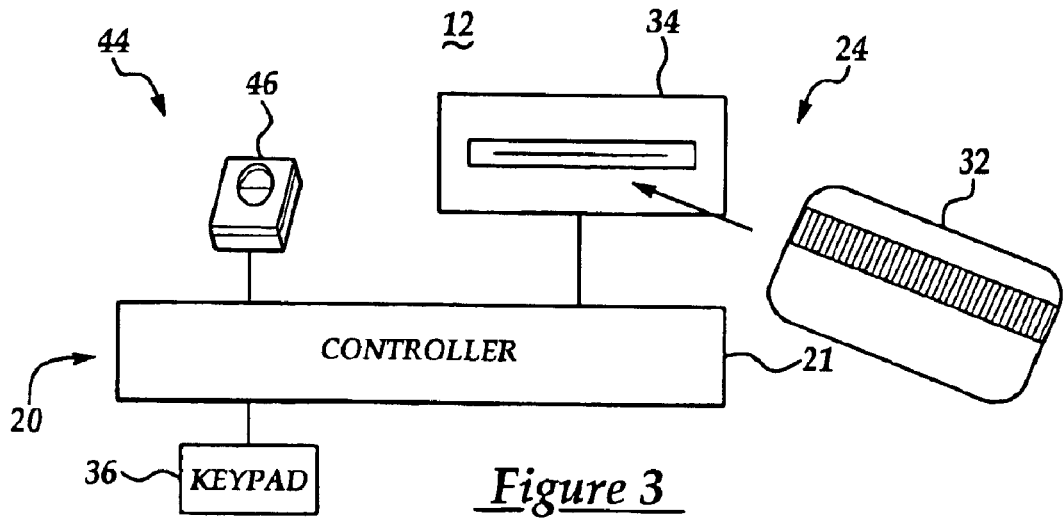
FIG. 3 is a block diagram of a gaming machine having a control system with a controller and an identification system, according to another embodiment of the present invention.

With reference to FIGS. 2 and 3, each gaming machine 12 includes a control system 20. In one embodiment, the control system 20 may include a micro-processor based controller 21 and a slot machine interface board (not shown). The control system 20 operates the game machine 12, e.g., runs the computer software program which controls the graphics, play, and jackpot according to the particular gaming machine 12. Operation of the control system 20 for controlling operation of the gaming machine 12 is well known in the art and therefore not further discussed.

The control system 20 also includes an identification system 24 for identifying an employee for the purpose of completing transactions (see below).

Returning to FIG. 1, the at least one gaming machine 12 is adapted to be played by a player 30 (shown at the first slot machine 12A). For the purposes of discussion, the following discussion involves payment of a handpay, e.g., a jackpot, however, the system 10 may also be used to complete other transactions (e.g., hopper fills, credits). If during play, the player 30 wins a jackpot, the jackpot may be paid either by the gaming machine 12A or by an employee (the first employee) 26, i.e., a hand pay. Determination of whether a jackpot is paid by the gaming machine 12A or is paid by the first employee 26 is determined using predetermined criteria.

Generally, payment of a jackpot by the first employee 26 also requires at least one additional employee. As described below, when a handpay is indicated by a gaming machine 12A, the first employee 26 must verify the handpay and take ownership of the handpay once it is verified. The first employee 26 must then go to a jackpot fill station 18 (typically, the closest jackpot fill station 18). Payment is authorized at the jackpot fill station 18. Once authorized, the funds (or a check) are received from the cashier 28 at the cashier station 22. After receipt of the funds, the first employee 26 returns to the gaming machine 12A, along with a second employee 48. The second employee 48 acts as a witness while the first employee 26 pays the player 30.

Further, a third employee 49 may be required to approve payment of a handpay. Typically, this is required when the handpay is over a predetermined amount and is performed at the jackpot fill station 18. For example, a handpay over a first predetermined amount may require approval by an assistant manager, while a handpay over a second predetermined amount may require approval by a manager.

The present invention provides a gaming system 10 and method 50, 60 which compare a known biometric characteristic with a sensed biometric characteristic of one of the employees identified above to confirm their identity during a transaction. In one embodiment, biometric characteristics are stored in a biometric database (not shown) for comparison with sensed biometric characteristics.

For example, if the transaction is a jackpot, the first employee 26 (which may be one of a plurality of employees on the casino floor 14) must walk to the gaming machine $12_A$ and take "ownership" of the transaction. Ownership of a transaction means that the first employee 26 is responsible for the transaction. For example for a jackpot, the first employee 26 is responsible for paying the jackpot to the player 30.

With specific reference to FIGS. 2 and 3, the identification system 24 is adapted to identify the first employee 26 and to assign the transaction to the first employee 26.

In one embodiment shown in FIG. 2, the first employee 26 takes ownership of the transaction through an identification card 32 and/or an identification number. The control system 20 includes an identification (ID) card reader 34 and a key pad 36. To take ownership of the transaction, the first employee 26 inserts their ID card 32 into the ID card reader 34 and/or enters their identification number or personal identification number on the key pad 36.

Returning to FIG. 1, a computer 38, located at the jackpot fill station 18, is connected to the network 16. The control system 20 sends the identification of the first employee 26 who has taken ownership of the transaction to the computer 38. The computer 38 receives the identification of the first employee 26 from the network 16.

As stated above, the first employee 26 is responsible for the transaction. In the example of the jackpot, to continue the process of paying the jackpot to the player 30, the first employee 26 goes to the jackpot fill station 18.

In one embodiment, the computer 38 provides a list of all available transactions (e.g., jackpots won but not yet paid and assigned to the first employee 26). In another embodiment, the first employee 26 identifies himself to the computer 38 through selection of his or her name, entry of the employee identification number and/or insertion of the ID card 32 into a card reader (not shown) connected to the computer 38. After the transaction has been chosen, the system 10 confirms the identity of the employee 26 using a biometric characteristic.

In one embodiment, the gaming system 10 includes a biometric sensor 40 coupled to the computer 38 for sensing a biometric characteristic of an employee.

In another embodiment, the first employee 26 selects the transaction from a list of available transactions displayed by the computer 38 and confirms his or her identify using the biometric sensor 40. In still another embodiment, the first employee 26 first identifies himself or herself to the computer 38 via the biometric sensor 40 and then chooses the transaction from a list of transaction assigned to the first employee 26 and displayed by the computer 38. Although several variations of the process of confirming the identity of the first employee 26 have been detailed above, the present invention is not limited to any one procedure. It should be apparent that many variations of the steps used to identify or confirm the identify of the first employee 26 using the biometric sensor 40 may be designed and are within the scope of the present invention.

The computer 38 is adapted to compare the sensed biometric characteristic with a stored characteristic of the first employee 26 and to confirm that the sensed biometric characteristic matches the stored characteristic of the first employee 26. In the example of the jackpot, payment is then authorized if a match is confirmed.

In one embodiment, the first employee 26 has previously identified him or herself to the computer 38, and thus, the sensed biometric characteristic is only compared with a stored characteristic of the first employee 26.

In another embodiment, the sensed biometric characteristic is compared with a plurality of stored characteristics. If a match is found, then the identity of the first employee 26 is confirmed.

The computer 38 may also be adapted to print out a ticket (not shown) signifying authorization of the transaction, e.g., payment of a jackpot in a conventional manner. In the example of the jackpot, the first employee 26 takes the ticket to the casher station 22. The first employee 26 signs both copies of the ticket and hands them to the cashier 28. The cashier 28 takes the ticket, counts out the funds, and hands the funds and a copy of the ticket to the first employee 26.

As described above, the first employee 26 and the second employee 48 return to the gaming machine 12 to pay the player 30. The second employee 48 acts as a witness while the first employee 26 pays the player 30.

In one embodiment, the stored characteristic of the first employee 26 is stored on the computer 38. In another embodiment, the stored characteristic is stored in a central location, for example, in the biometric database on a server (not shown) connected to the computer 38 via the network 16.

In a first embodiment, the biometric characteristic includes a geometric pattern defined by a physical attribute of the employee 26, for example, a fingerprint. Returning to FIG. 1, the biometric sensor 40 is a fingerprint sensor 42. A suitable fingerprint sensor is available from DigitalPersona, Inc. of Redwood City, Calif. as model no. U.are.U 2000. The U.are.U 2000 fingerprint sensor connects to the computer 38 via a Universal Serial Bus (USB) connector (not shown).

Other examples of suitable biometric characteristics defined by a physical attribute, and which may be sensed by a suitable sensor, include:

a geometric pattern of veins (in the eye or other portion of the body), facial patterns, and geometric pattern in the retina of the eye.

Other examples of suitable biometric characteristics include:

signature of the employee (via a digitizer and signature recognition software), and, a spoken phrase (via a microphone, digitizer, and voice recognition software).

With regard to the latter example, in one embodiment, the spoken phrase is the employee's name. In another embodiment, the spoken phrase is a password.

With reference to FIG. 3, in another embodiment, the first employee 26 takes ownership of the transaction, at the gaming machine $12_A$ via identification by a biometric characteristic. The identification module 24 includes a second biometric sensor 44. In the illustrated embodiment, the second biometric sensor 44 is a fingerprint sensor 46. In a first embodiment, the first employee 26 is identified based solely on the sensed biometric characteristic.

In a second embodiment, the first employee 26 is identified via the ID card 32 and card reader 34, entry of an identification number, or other suitable means. The sensed biometric characteristic is used to confirm identity at the gaming machine $12_A$.

Suitable biometric characteristics to confirm identity of the employee 26 at the gaming machine 12 include, but are not limited to:

geometric patterns in physical attributes, e.g., fingerprints or facial characteristics, signature of the employee, and, spoken phrase.

Furthermore, the identification system 24 located at the gaming machine $12_A$ may be used to identify or confirm the identity of the second employee 48 when acting as a witness, e.g., for the payment of the jackpot to the player 30 by the first employee 26.

Additionally, if the release of the funds to pay the jackpot requires authorization by the third employee 49, the identification of the third employee 49 may be confirmed using the second biometric sensor 44 located at the jackpot fill station 18.

Figure 4:
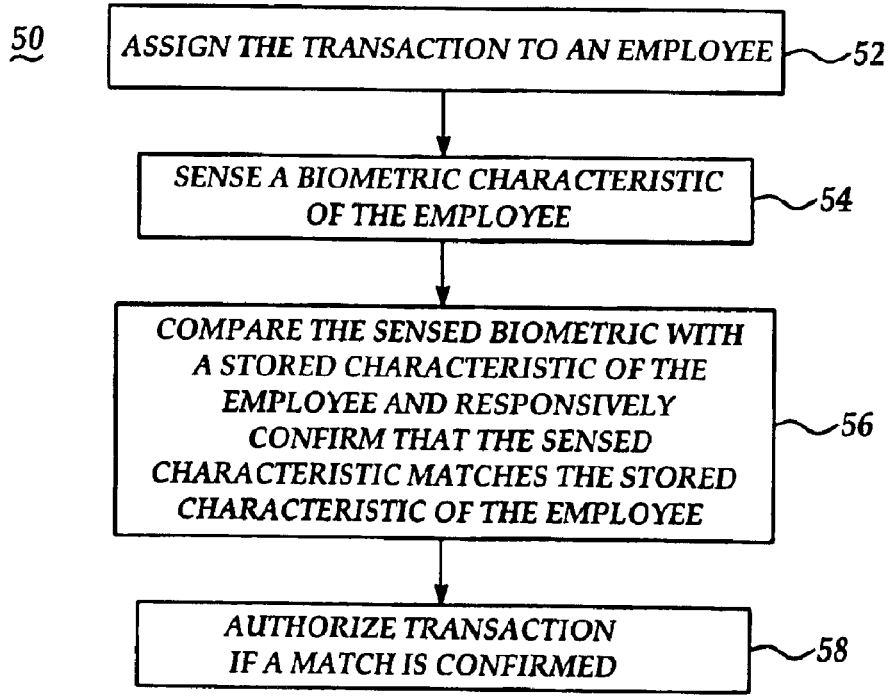
FIG. 4 is a first flow diagram detailing operation of the system of FIG. 1, according to an embodiment of the present invention; and, FIG. 5 is a second flow diagram detailing operation of the system of FIG. 1, according to another embodiment of the present invention.

With reference to FIG. 4, in another aspect of the present invention, a method 50 for completing a transaction associated with a gaming machine 12, e.g., a jackpot, is provided. In a first process step 52, the transaction is assigned to a first employee 26 of the casino. In a second process step 54, a biometric characteristic of the first employee 26 is sensed.

In a third process step 56, the sensed biometric characteristic is compared with a stored characteristic of the first employee 26. The method 50 responsively confirms that the sensed biometric matches the stored characteristic of the first employee 26. In a fourth process step 58, the transaction is authorized if a match is confirmed. For example in one embodiment of payment of a jackpot, a ticket is printed. The first employee 26 takes the ticket to the cashier station 22 for payment. If the amount of the payment is over a predetermined value then the payment may require additional authorization by another employee, e.g., the cashier 22. The additional authorization may also be made via biometrics. Alternatively, the funds may be paid at the jackpot fill station 18, using a cash dispensing peripheral (not shown). As with payment at the cashier station 28, if the payment is over a predetermined value, then payment may require additional authorization by another employee. The additional authorization may also be made via biometrics.

In one embodiment, the step of assigning the transaction to the first employee 26 includes the steps of (i) identifying the first employee 26 to the control system 20 located on the gaming machine $12_A$ and (ii) transferring the identity of the first employee 26 to the computer 38 located at the jackpot fill station 18. As described above, the gaming machine $12_A$ includes the ID card reader 34 coupled to the control system 20. In a further embodiment, the step of identifying the first employee 26 includes the step of inserting, by the employee 26, the employee identification card 32 into the card reader 34. In still a further embodiment, the gaming machine $12_A$ includes the key pad 36 and the step of identifying the first employee 26 includes the step of entering, by the first employee 26, an employee personal identification number on the key pad 36.

As discussed above, the step of sensing a biometric characteristic of the first employee 26 is accomplished using the biometric sensor.

In another embodiment, the step of assigning, at the gaming machine 12A, the jackpot to the first employee 26 includes the step of identifying the first employee 26 to the control system 20 located on the gaming machine 12A using the second biometric sensor 44. The second biometric sensor 44 is adapted to sense the biometric characteristic of the first employee 26.

Suitable biometric characteristics include:
geometric patterns in physical attributes, e.g., fingerprints or facial characteristics,
signature of the employee, and,
spoken phrase (see above).

Figure 5:
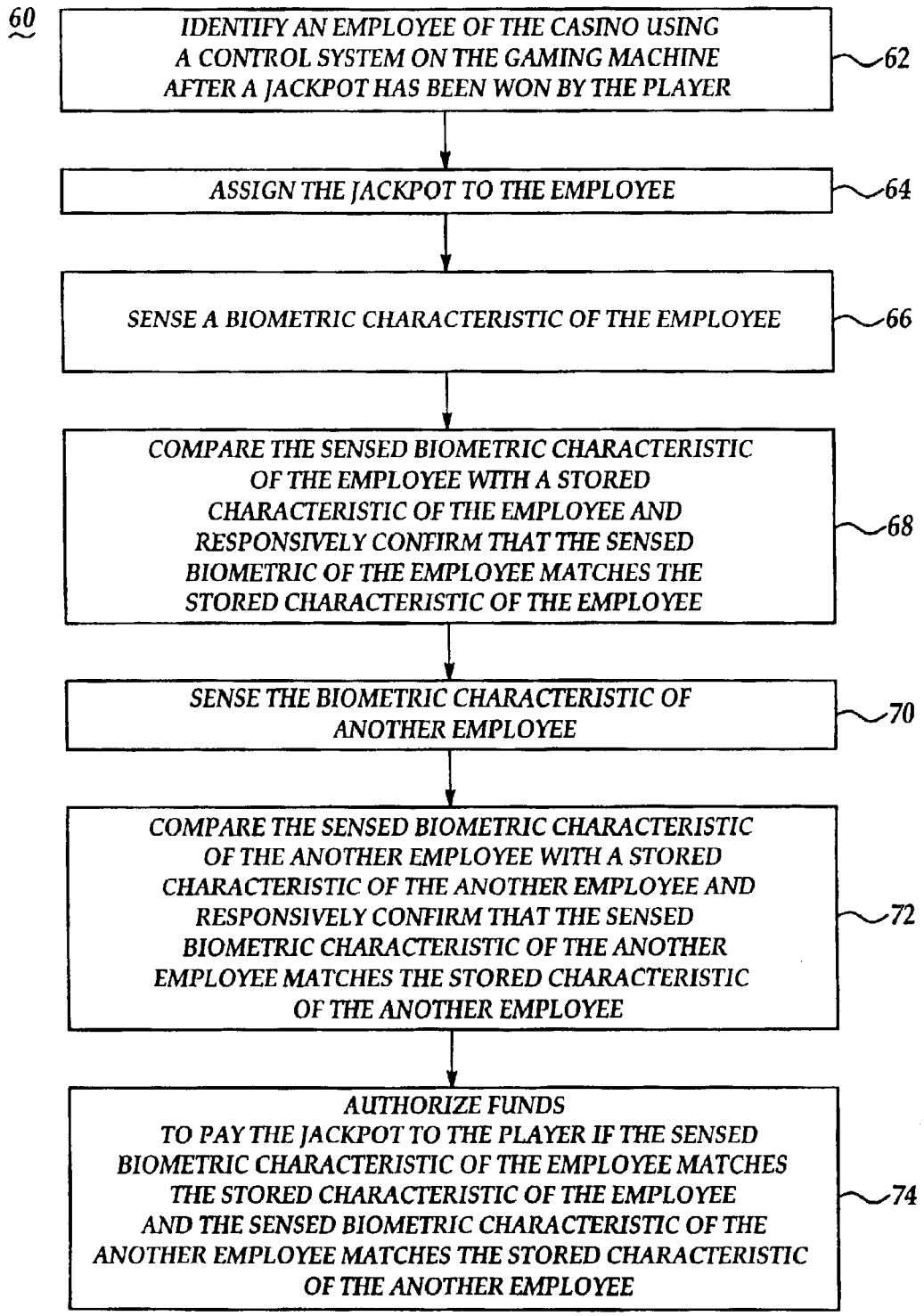

With reference to FIG. 5, in a third aspect of the present invention, a method 60 of completing a transaction associated with a gaming machine 12, e.g., paying a jackpot, is provided.

In a first process step 62, an employee (the first employee) 26 of the casino is identified using a control system 20. In a second process step 64, the transaction is assigned to the employee 26. In a third process step 66, a biometric characteristic of the employee 26 is sensed using the biometric sensor 40 at the jackpot fill station 18.

In a fourth process step 68, the sensed biometric characteristic of the employee 26 is compared with a stored characteristic of the employee 26. The method 60 responsively confirms that the sensed biometric of the employee 26 matches the stored characteristic of the employee 26. In a fifth process step 70, the biometric characteristic of another (the third) employee 49, e.g., an assistant manager or manager, is sensed using the biometric sensor 40.

In a sixth process step 72, the sensed biometric characteristic of the another employee 49 is compared with a stored characteristic of the another employee 49. The method 60 responsively confirms that the sensed biometric characteristic of the another employee 49 matches the stored characteristic of the another employee 49. The transaction is authorized if the sensed biometric characteristic of the first employee 26 matches the stored characteristic of the first employee 26 and the sensed biometric characteristic of the another employee 49 matches the stored characteristic of the another employee 49. For example for payment of a jackpot, in one embodiment, a ticket is printed. The first employee 26 takes the ticket to the cashier station 22 for payment. If the amount of the payment is over a predetermined value then the payment may require additional authorization by another employee, e.g., the cashier 28. The additional authorization may also be made via biometrics. Alternatively, the funds may be paid at the jackpot fill station 18, using a cash dispensing peripheral (not shown). As with payment at the cashier station 22, if the payment is over a predetermined value, then payment may require additional authorization by another employee. The additional authorization may also be made via biometrics.

Obviously, many modifications and variations of the present invention are possible in light of the above teachings. For example, the present invention has been described above relative to a process for paying a jackpot to a player. Other factors present may require that the process be modified without departing from the spirit of the invention. For example, the player may request payment by check. Or the player may not have proper identification on their person to receive a jackpot. These additional factors may require that additional steps be added to the process. The invention may be practiced otherwise than as specifically described within the scope of the appended claims. Other aspects and features of the present invention can be obtained from a study of the drawings, the disclosure, and the appended claims.

What is claimed is:

1. A method for paying a jackpot to a player of a gaming machine in a gaming environment, said method comprising the steps of:

identifying a first employee at the gaming machine;
assigning the jackpot to the first employee after identifying the first employee;
registering the assigned jackpot on a computer at a jackpot fill station;
authorizing access to the computer at the jackpot fill station to the first employee to allow the first employee to select the assigned jackpot for processing;
sensing a biometric characteristic of the first employee at the jackpot fill station after the first employee has selected the assigned jackpot for processing and independent of authorizing access to the computer at the jackpot fill station to the first employee;
comparing the sensed biometric characteristic with a stored characteristic of the first employee and responsively confirming that the sensed biometric matches the stored characteristic of the first employee; and,
authorizing payment of the jackpot to the player if a match is confirmed.

2. A method, as set forth in claim 1, including the step of transferring an identity of the first employee to the computer located at the jackpot fill station.

3. A method, as set forth in claim 2, wherein the step of identifying the first employee includes the step of inserting, by the first employee, an employee identification (ID) card into an identification (ID) card reader.

4. A method, as set forth in claim 3, wherein the step of identifying the first employee further includes the step of entering, by the first employee, an employee personal identification number (PIN) into a keypad.

5. A method, as set forth in claim 1, wherein the step of sensing the biometric characteristic is further defined as sensing a geometric pattern defined by a physical attribute of the first employee.

6. A method, as set forth in claim 5, wherein the step of sensing the geometric pattern defined by the physical attribute of the first employee is further defined as sensing a fingerprint of the first employee.

7. A method, as set forth in claim 5, wherein the step of sensing the geometric pattern defined by the physical attribute of the first employee is further defined as sensing a plurality of veins of the first employee.

8. A method, as set forth in claim 5, wherein the step of sensing the geometric pattern defined by the physical attribute of the first employee is further defined as sensing an eye of the first employee.

9. A method, as set forth in claim 1, wherein the step of sensing the biometric characteristic is further defined as sensing a signature of the first employee.

10. A method, as set forth in claim 1, wherein the step of sensing the biometric characteristic is further defined as sensing a password spoken by the first employee.

11. A method, as set forth in claim 1, including the steps of:
releasing funds to the first employee after authorizing payment of the jackpot to the player; and,
witnessing, by another employee, payment of the funds to the player by the first employee.

12. A method, as set forth in claim 1, including the steps of:
sensing a biometric characteristic of a second employee acting as a witness to payment of the jackpot to the player;
comparing the sensed biometric of the second employee with a stored characteristic of the second employee; and, responsively confirming that the sensed biometric of the second employee matches the stored characteristic of the second employee.

13. A method, as set forth in claim 12, wherein the step of authorizing payment of the jackpot to the player is further defined as authorizing payment of the jackpot to the player after responsively confirming that the sensed biometric of the first employee matches the stored characteristic of the first employee and the sensed biometric of the second employee matches the stored characteristic of the second employee.

14. A method for paying a jackpot to a player of a gaming machine in a gaming environment, said method comprising the steps of:

provingdiding access to a computer at a jackpot fill station to a first employee to allow the first employee to select the jackpot for processing, the first employee being assigned to the jackpot;

sensing a biometric characteristic of the first employee at the jackpot fill station after the first employee has selected the jackpot for processing and independent of authorizing access to the computer at the jackpot fill station to the first employee;

comparing the sensed biometric characteristic with a stored characteristic of the first employee and responsively confirming that the sensed biometric matches the stored characteristic of the first employee; and, authorizing payment of the jackpot to the player if a match is confirmed.

15. A method, as set forth in claim 14, including the step of identifying the first employee prior to providing access to the computer at the jackpot fill station.

16. A method, as set forth in claim 15, wherein the step of identifying the first employee further includes the steps of:

inserting, by the first employee, an employee identification (ID) card into an identification (ID) card reader; and, entering, by the first employee, an employee personal identification number (PIN) into a keypad.

17. A method, as set forth in claim 14, wherein the step of sensing the biometric characteristic is further defined as sensing a geometric pattern defined by a physical attribute of the first employee.

18. A method, as set forth in claim 17, wherein the step of sensing the geometric pattern defined by the physical attribute of the first employee is further defined as sensing a fingerprint of the first employee.

19. A method, as set forth in claim 17, wherein the step of sensing the geometric pattern defined by the physical attribute of the first employee is further defined as sensing a plurality of veins of the first employee.

20. A method, as set forth in claim 17, wherein the step of sensing the geometric pattern defined by the physical attribute of the first employee is further defined as sensing an eye of the first employee.

21. A method, as set forth in claim 14, wherein the step of sensing the biometric characteristic is further defined as sensing a signature of the first employee.

22. A method, as set forth in claim 14, wherein the step of sensing the biometric characteristic is further defined as sensing a password spoken by the first employee.

23. A method, as set forth in claim 14, including the steps of:

releasing funds to the first employee after authorizing payment of the jackpot to the player; and, witnessing, by another employee, payment of the funds to the player by the first employee.

24. A method, as set forth in claim 14, including the steps of:

sensing a biometric characteristic of a second employee acting as a witness to payment of the jackpot to the player;

comparing the sensed biometric of the second employee with a stored characteristic of the second employee; and, responsively confirming that the sensed biometric of the second employee matches the stored characteristic of the second employee.

25. A method, as set forth in claim 24, wherein the step of authorizing payment of the jackpot to the player is further defined as authorizing payment of the jackpot to the player after responsively confirming that the sensed biometric of the first employee matches the stored characteristic of the first employee and the sensed biometric of the second employee matches the stored characteristic of the second employee.

* * * * *

UNITED STATES PATENT AND TRADEMARK OFFICE
CERTIFICATE OF CORRECTION

PATENT NO. : 6,892,938 B2  Page 1 of 1
APPLICATION NO. : 10/217971
DATED : May 17, 2005
INVENTOR(S) : Gregg Solomon It is certified that error appears in the above-identified patent and that said Letters Patent is hereby corrected as shown below:

Column 8, line 16, after "sensed biometric" please add --characteristic--.

Column 8, line 65, after "sensed biometric" please add --characteristic--.

Column 9, line 1, after "sensed biometric" please add --characteristic--.

Column 9, line 7, after "sensed biometric" please add --characteristic--.

Column 9, line 9, after "sensed biometric" please add --characteristic--.

Column 9, line 26, after "sensed biometric" please add --characteristic--.

Column 10, line 30, after "sensed biometric" please add --characteristic--.

Column 10, line 34, after "sensed biometric" please add --characteristic--.

Column 10, line 40, after "sensed biometric" please add --characteristic--.

Column 10, line 42, after "sensed biometric" please add --characteristic--.

Signed and Sealed this

Nineteenth Day of September, 2006

JON W. DUDAS
*Director of the United States Patent and Trademark Office*